US008290453B2

(12) United States Patent
Yoshihara (10) Patent No.: US 8,290,453 B2
(45) Date of Patent: Oct. 16, 2012

(54) POWER COMBINER, AMPLIFIER, AND TRANSMITTER

(75) Inventor: Yoshiaki Yoshihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 923 days.

(21) Appl. No.: 12/212,757

(22) Filed: Sep. 18, 2008

(65) Prior Publication Data
US 2009/0258617 A1 Oct. 15, 2009

(30) Foreign Application Priority Data

Apr. 11, 2008 (JP) .............................. P2008-104097

(51) Int. Cl.
*H01Q 11/12* (2006.01)
(52) U.S. Cl. ........................ 455/127.1; 455/69; 330/124
(58) Field of Classification Search ............... 455/127.1, 455/69; 330/124
See application file for complete search history.

(56) References Cited

U.S. PATENT DOCUMENTS

| 4,186,352 | A | 1/1980 | Hallford | |
|---|---|---|---|---|
| 7,242,245 | B2* | 7/2007 | Burns et al. | 330/124 R |
| 7,283,793 | B1* | 10/2007 | McKay | 455/83 |
| 7,345,557 | B2* | 3/2008 | Podell | 333/109 |
| 7,692,512 | B2* | 4/2010 | Podell | 333/26 |
| 7,714,777 | B2* | 5/2010 | Fukuda | 342/175 |

(Continued)

FOREIGN PATENT DOCUMENTS

JP 09-232890 9/1997

(Continued)

OTHER PUBLICATIONS

Aoki, et al., Fully Integrated CMOS Power Amplifier Design Using the Distributed Active-Transformer Architecture, IEEE Journal of Solid-State Circuits, vol. 37, No. 3, pp. 371-383, Mar. 2002.
Patent Abstract of Japan for Japanese Publication No. 04-230131, dated Aug. 19, 1992.
Patent Abstract of Japan for Japanese Publication No. 07-143102, dated Jun. 2, 1995.

(Continued)

*Primary Examiner* — Nay A Maung
*Assistant Examiner* — Chung-Tien Yang
(74) *Attorney, Agent, or Firm* — Turocy & Watson, LLP (57) ABSTRACT

This power combiner includes a first balun and a second balun. The first balun includes: a first line having a grounded end and an end connected to a positive input of a first differential input signal; a second line having a grounded end and an end connected to a negative input of the first differential input signal; a third line formed in parallel with the first line, the third line having an opened end corresponding to the grounded end of the first line and an end being different from the opened end; and a fourth line formed in parallel with the second line, the fourth line having a single-ended output end corresponding to the grounded end of the second line and an end connected to the end being different from the opened end of the third line. The second balun includes: a fifth line having a grounded end and an end connected to a positive input of a second differential input signal; a sixth line having a grounded end and an end connected to a negative input of the second differential input signal; a seventh line formed in parallel with the fifth line, the seventh line having an opened end corresponding to the grounded end of the fifth line and an end different from the opened end of the seventh line; and an eighth line formed in parallel with the sixth line, the eighth line having a single-ended output end corresponding to the grounded end of the sixth line and an end connected to the end different from the opened end of the seventh line.

7 Claims, 9 Drawing Sheets

U.S. PATENT DOCUMENTS

2007/0030063 A1 2/2007 Izumi et al.
2008/0266020 A1 10/2008 Nosaka

FOREIGN PATENT DOCUMENTS

| JP | 2004-056799 | 2/2004 |
| JP | 2005-151543 | 6/2005 |
| WO | 2005/076404 A1 | 8/2005 |

OTHER PUBLICATIONS

Patent Abstract of Japan for Japanese Publication No. 62-114305, dated May 26, 1987.
Japanese Office Action for Japanese Application No. 2008-104097 mailed on Jun. 12, 2012.

* cited by examiner

POWER COMBINER, AMPLIFIER, AND TRANSMITTER

CROSS-REFERENCE TO RELATED APPLICATION

This application is based upon and claims the benefit of priority from the prior Japanese Patent Application No. 2008-104097, filed on Apr. 11, 2008; the entire contents of which are incorporated herein by reference.

BACKGROUND OF THE INVENTION

1. Field of the Invention

The present invention relates to a power combiner, an amplifier and a transmitter which are applicable to, for example, the power combining.

2. Description of the Related Art

In general, a radio transmitter has a Power Amplifier (PA) to send a signal with a predetermined power to antenna. In case that the large power is particularly necessary, a plurality of amplifier connected in parallel may be provided and each amplified output is combined to obtain the prescribed power, because there is a limitation in voltage amplitude in accordance with a characteristic of a amplifying device such as a transistor (for example, see the reference, "I. Aoki, et., al., "Fully Integrated CMOS Power Amplifier Design Using the Distributed Active-Transformer Architecture", IEEE JSSC, Vol. 37, No. 3, March 2002, pp. 371-383."; the entire contents of which are incorporated herein). The reference describes an example of the power amplifier having four differential amplifiers and four transformers for power combining.

In the power amplifier described in the reference, since all of the secondary terminals (the output terminals) of the transformers to combine the amplified outputs are connected in series, the series line length at the secondary terminals side is long. Therefore, a loss caused by the series resistance and the substrate resistance is large and the available frequency bandwidth is narrow. Namely, the loss at the power combiner is large, and as a result, there is a problem that the output power, the efficiency and the available frequency bandwidth of the power amplifier using the power combiner are degraded.

As stated above, in the conventional power combiner, amplifier and transmitter, there is a problem that the output power, the efficiency and the available frequency bandwidth of the power combiner, amplifier and transmitter are deteriorated. The present invention is made to solve the problem as stated above, and an object thereof is to realize a power combiner having low loss and wide available bandwidth characteristics as well as provide an amplifier and a transmitter having large power output, high efficiency and wide available bandwidth characteristics.

BRIEF SUMMARY OF THE INVENTION

To attain the above-stated object, a power combiner, an amplifier and a transmitter according to an aspect of the present invention includes a first balun and a second balun. The first balun includes: a first line having a grounded end and an end connected to a positive input of a first differential input signal; a second line having a grounded end and an end connected to a negative input of the first differential input signal; a third line formed in parallel with the first line, the third line having an opened end corresponding to the grounded end of the first line and an end being different from the opened end; and a fourth line formed in parallel with the second line, the fourth line having a single-ended output end corresponding to the grounded end of the second line and an end connected to the end being different from the opened end of the third line. The second balun includes: a fifth line having a grounded end and an end connected to a positive input of a second differential input signal; a sixth line having a grounded end and an end connected to a negative input of the second differential input signal; a seventh line formed in parallel with the fifth line, the seventh line having an opened end corresponding to the grounded end of the fifth line and an end different from the opened end of the seventh line; and an eighth line formed in parallel with the sixth line, the eighth line having a single-ended output end corresponding to the grounded end of the sixth line and an end connected to the end different from the opened end of the seventh line.

DETAILED DESCRIPTION OF THE INVENTION

The present invention realizes a power combiner by use of Marchand Baluns in order to shorten the series line length of the power combiner and improve the frequency characteristics thereof. The Marchand Balun is a balun, which is composed of the distributed element model circuit, capable of converting the differential input (balanced input) to the single-ended output (unbalanced output). An embodiment of the present invention realizes a power combiner by having a plurality of the Marchand Baluns and connecting their unbalanced outputs having the same phase each other to provide combined output.

First Embodiment

Figure 1:
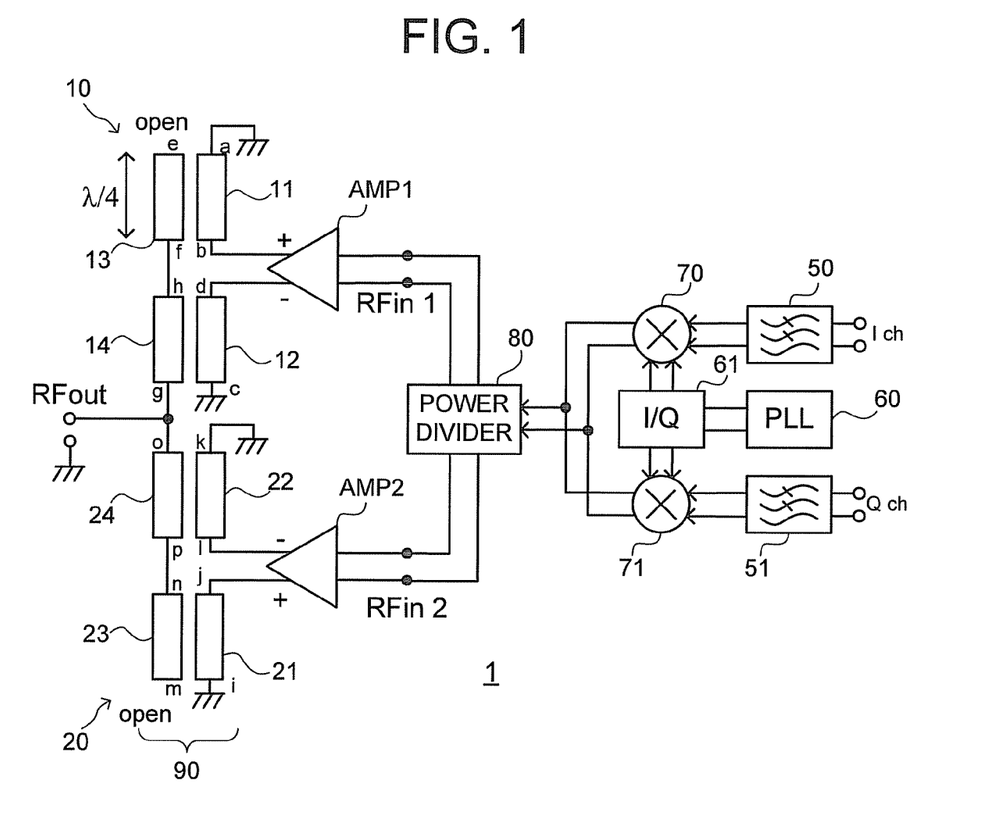
FIG. 1 is a block diagram showing a configuration of a transmitter of one embodiment of the present invention.

Hereinafter, one embodiment of the present invention is described in detail with reference to the drawings. FIG. 1 is a block diagram showing a configuration of a transmitter of the embodiment of the present invention. As shown in FIG. 1, the transmitter 1 of the embodiment includes filters 50 and 51, a PLL 60, a phase shifter 61, mixers 70 and 71, a power divider 80, amplifiers AMP1 and AMP2, and a power combiner 90.

The filters 50 and 51 cut high frequency components respectively from the baseband signals of I,Q channels being sent from a signal processor not shown in the drawing. The PLL 60 is a local oscillator to generate a local signal for converting the baseband signal to an RF signal. The phase shifter 61 performs a π/2 phase-shifting for a part of the local signal generated by the PLL 60, and sends the original local signal and the phase-shifted local signal to the mixers 70 and 71 respectively.

The mixer 70 multiplies the original local signal received from the phase shifter 61 and the baseband signal of I channel passed through the filter 50 to perform the frequency conversion to the RF signal. Similarly, the mixer 71 multiplies the phase-shifted local signal received from the phase shifter 61 and the baseband signal of Q channel passed through the filter 51 to perform the frequency conversion to the RF signal. These two RF signals frequency-converted by the mixers 70 and 71 are combined and sent to the power divider 80.

The configuration from the filters 50 and 51 to the mixers 70 and 71 is an example by use of the direct conversion system. The RF signals may be generated by any other systems.

The power divider 80 divides the received RF signal. The amplifiers AMP1 and AMP2 amplify the two RF signals divided by the power divider 80 up to the prescribed power respectively. The operations of the amplifiers AMP1 and AMP2 can be done in the classes A-C and D-F, depending on the modulation types of the RF signals. In this embodiment, the amplifiers AMP1 and AMP2 output the differential signals (balanced signals).

The power combiner 90 combines the amplified signals of the amplifiers AMP1 and AMP2 (the first differential input signal/the second differential input signal). The power combiner 90 includes a first balun 10 and a second balun 20. The power combiner 90 outputs the combined RF signal as the single-ended signal (unbalanced signal).

The first and the second baluns 10 and 20 are the Marchand Balun composed of the distributed element model circuit. The first balun 10 includes: a first line 11 with λ/4 length in which one end thereof ("a" in the drawing; hereinafter described in the same manner) is grounded and another end (b) thereof is connected to a positive output (the positive side of the amplified output) of the amplifier AMP1; a second line 12 with λ/4 length in which one end (c) thereof is grounded and another end (d) thereof is connected to a negative output (the negative side of the amplified output) of the amplifier AMP1; a third line 13 with λ/4 length formed in parallel with the first line 11 in which one end (e) thereof corresponding to the grounded end (a) of the first line 11 is opened; and a forth line 14 with λ/4 length formed in parallel with the second line 12 in which one end (g) thereof corresponding to the grounded end (c) of the second line 12 is connected to the RF output (RFout) and another end (h) thereof is connected to another end (f) of the third line 13. The first line 11 and the third line 13 are coupled electromagnetically, and the second line 12 and the forth line 14 are coupled electromagnetically. The end (f) of the third line 13 and the end (h) of the forth line 14 may be formed integrally, or may be connected via a line. Here, λ denotes a wavelength of the signal to be combined substantially.

Similarly, the second balun 20 includes: a fifth line 21 with λ/4 length in which one end (i) thereof is grounded and another end (j) thereof is connected to a positive output of the amplifier AMP2; a sixth line 22 with λ/4 length in which one end (k) thereof is grounded and another end (l) thereof is connected to a negative output of the amplifier AMP2; a seventh line 23 with λ/4 length formed in parallel with the fifth line 21 in which one end (m) thereof corresponding side to the grounded end (i) of the fifth line 21 is opened; and an eighth line 24 with λ/4 length formed in parallel with the sixth line 22 in which an end (o) thereof corresponding to the grounded end (k) of the sixth line 22 is connected to the RF output and another end (p) thereof is connected to another end (n) of the seventh line 23. As similar as the first balun 10, the fifth line 21 and the seventh line 23 are coupled electromagnetically, and the sixth line 22 and the eighth line 24 are coupled electromagnetically. The end (n) of the seventh line 23 and the end (p) of the eighth line 24 may be formed integrally, or may be connected via a line.

The first balun 10 and the second balun 20 are composed of, for example, a conductive layer as a strip line formed on a dielectric substrate (not shown in the drawing). The electromagnetic couplings between the lines are realized by providing the lines in close positions with a prescribed distance. The lines to be coupled each other may be formed on the different substrates respectively to form a layer structure in order to couple in a vertical direction with respect to the substrates.

As shown in FIG. 1, in the first balun 10 and the second balun 20, a pair of the end (b) of the first line 11 and the end (d) of the second line 12, and a pair of the end (j) of the fifth line 21 and the end (l) of the sixth line 22 function as differential terminals. On the other hand, the RF output used with ground functions the single-ended terminal.

In the transmitter 1 of this embodiment, the RF signal from the mixers 70 and 71 is divided in two to input to two amplifiers AMP1 and AMP2. The amplifiers AMP1 and AMP2 amplify each of the divided RF signals up to the prescribed power respectively and input each of the outputs thereof to the differential terminals of the first balun 10 and the second balun 20 respectively as the differential outputs. In the first balun 10 and the second balun 20, since the single-ended output terminals outputting the same phase signals each other are connected each other, the RF signals amplified by the amplifiers AMP1 and AMP2 respectively are combined to output at the RF output (RFout).

According to the power combiner, the amplifier and the transmitter of this embodiment, it is possible to shorten the line length of the line connected from the output terminals in series, compared to the example in which the single-ended terminals are connected from the output in series. Namely, it is possible to reduce the loss of the power combiner caused by the series resistance and the substrate resistance, and widen the available frequency bandwidth. As the result, it enables the amplifier and the transmitter to enhance the output power, efficiency and available frequency bandwidth.

Here, the principle of operation of the power combiner 90 in this embodiment will be described in detail with reference to FIG. 2. FIG. 2A to FIG. 2D are the conceptual diagram explaining the principle of operation of the power combiner 90 of this embodiment.

Figure 2A:
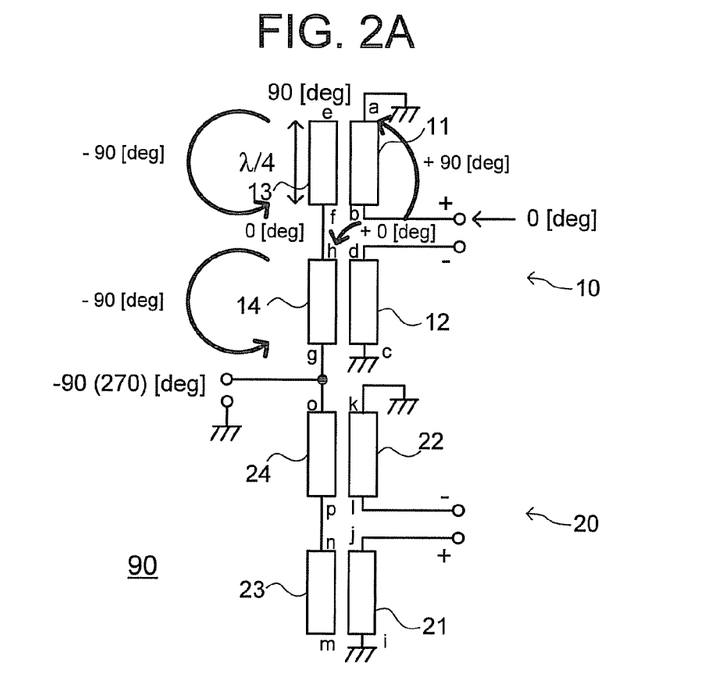
FIG. 2A is the conceptual diagram describing the operation of the power combiner of the embodiment shown in FIG. 1.

First, in the first balun 10 with reference to FIG. 2A, it is assumed that the phase at the positive output of the amplifier AMP1 is zero-phase. When a phase at the side of the end (b) of the first line 11 connected to the positive output of the amplifier AMP1 is zero degree, the phase lead of 90 degrees is given at the grounded end (a) because the end (a) is grounded. Since the first line 11 and the third line 13 are electromagnetically coupled each other, the phase lead of 90 degrees is also given at the opened end (e) of the third line 13 at the corresponding side of the end (a) of the first line 11. The phase at the other end (f) is still zero degree. Then, the phase lag of 90 degrees (forwarded−90 degrees or 270 degrees) is given at the end (g) of the forth line 14 in which the other end (h) thereof is connected to the end (f) of the third line 13. Namely, the phase at the RF output is −90 degrees when the phase at the positive output of the amplifier AMP1 is zero degree.

Figure 2B:
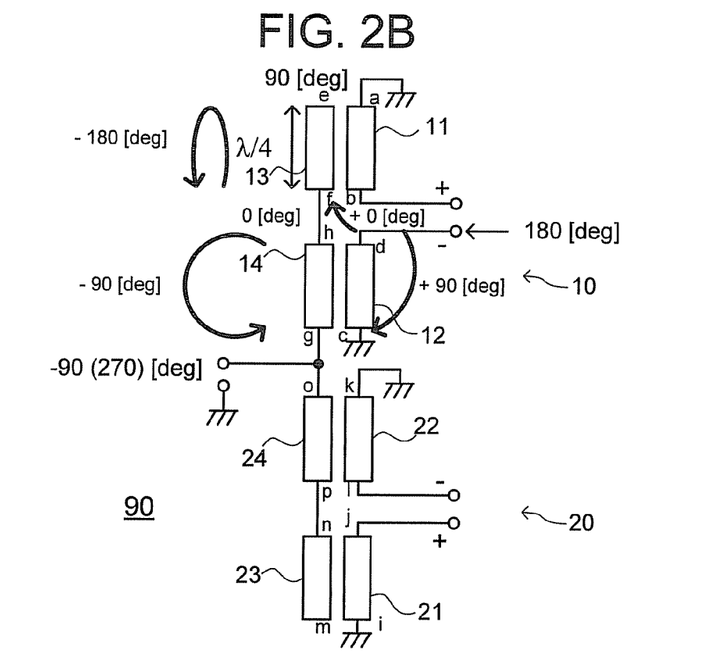
FIG. 2B is the conceptual diagram describing the operation of the power combiner of the embodiment shown in FIG. 1.

Next, it is assumed that the phase at the negative output of the amplifier AMP1 is 180 degrees with reference to FIG. 2B. When a phase at the side of the end (d) of the second line 12 connected to the negative output of the amplifier AMP1 is 180 degrees, the phase lead of 90 degrees is given at the grounded end (c) so that the phase is forwarded to the phase of 270 degrees because the end (c) of the second line 12 is grounded. Since the second line 12 and the forth line 14 are electromagnetically coupled each other, the phase at the end (g) of the forth line 14 at the corresponding side of the end (c) of the second line 12 is also 270 degrees, and the phase at the other end (h) is 180 degrees. Then, the phase lag of 90 degrees is given at the end (e) of the third line 13 in which the end (f) thereof is connected to the end (h) of the forth line 14, and the phase lag of 90 degrees is further given at the ends (f) and (h), i.e. in total the phase lag of 180 degrees is given at the ends (f) and (h), because the signal is reflected at the opened end (e) of the third line 13. Namely, the phase of the reflected signal is zero-degrees (=180−180). Further, the phase of the reflected signal is −90 degrees at the end (g) connected to the RF output since the forth line 14 gives the additional phase lag of 90 degrees.

The second balun 20 is the similar as above. It is assumed that the phase at the negative output of the amplifier AMP2 is 180 degrees with reference to FIG. 2C. When a phase at the side of the end (l) of the sixth line 22 connected to the negative output of the amplifier AMP2 is 180 degrees, the phase lead of 90 degrees is given at the grounded end (k) so that the phase is forwarded to the phase of 270 degrees because the end (k) of the sixth line 22 is grounded. Since the sixth line 22 and the eighth line 24 are electromagnetically coupled each other, the phase at the end (o) of the eighth line 24 at the corresponding side of the end (k) of the sixth line 22 is also 270 degrees, and the phase at the other end (p) is 180 degrees. Then the phase lag of 90 degrees is given at the end (m) of the seventh line 17 in which the end (n) thereof is connected to the end (p) of the eighth line 24, and the phase lag of 90 degrees is further given at the ends (n) and (p), i.e. in total the phase lag of 180 degrees is given at the ends (n) and (p), because the signal is reflected at the opened end (m) of the third line 13. Namely, the phase of the reflected signal is zero-degrees (=180−180). Further, the phase of the reflected signal is −90 degrees at the end (o) connected to the RF output since the eighth line 24 gives the additional phase lag of 90 degrees.

Figure 2C:
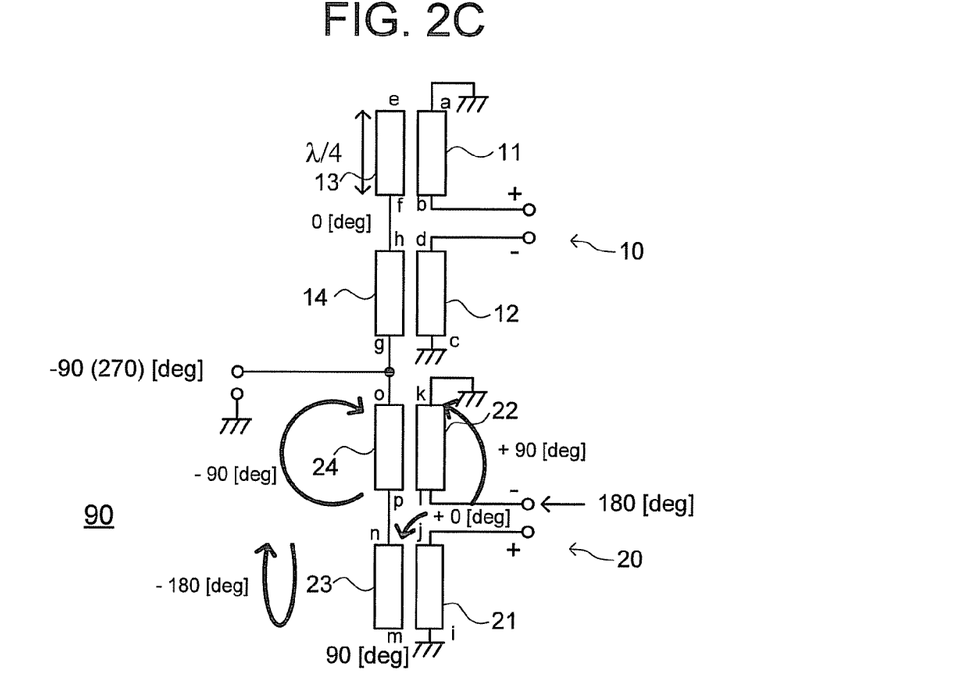
FIG. 2C is the conceptual diagram describing the operation of the power combiner of the embodiment shown in FIG. 1.
Figure 2D:
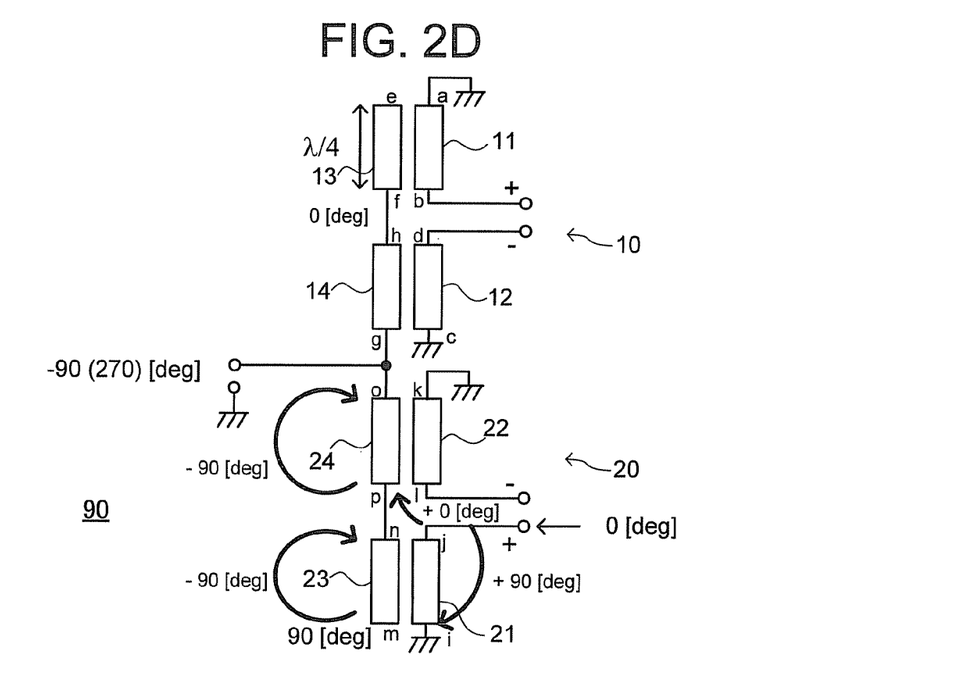
FIG. 2D is the conceptual diagram describing the operation of the power combiner of the embodiment shown in FIG. 1.

Next, it is assumed that the phase at the positive output of the amplifier AMP2 is zero-degree with reference to FIG. 2D. When a phase at the side of the end (j) of the fifth line 21 connected to the positive output of the amplifier AMP2 is zero degree, the phase lead of 90 degrees is given at the grounded end (i) because the end (i) of the fifth line 21 is grounded. Since the fifth line 21 and the seventh line 23 are electromagnetically coupled each other, the phase at the opened end (m) of the seventh line 23 at the corresponding side of the end (i) of the fifth line 21 is also 90 degrees, and the phase of the other end (n) is zero degree. Then, the phase lag of 90 degrees (forwarded −90 degrees or 270 degrees) is given at the end (o) of the eighth line 24 in which the end (p) thereof is connected to the end (n) of the seventh line 23. Namely, the phase at the RF output is −90 degrees when the phase at the positive output of the amplifier AMP2 is zero degree.

As a result, when each of the phases of the positive outputs of the amplifiers AMP1 and AMP2 is zero-degree, the phase at the RF output is always −90 degrees. This means that all of the positive and negative outputs of the amplifiers AMP1 and AMP2 are combined in same phase and the power combining is realized.

As above, the power combiner, the amplifier and the transmitter of this embodiment include the parallel power combiner using the Marchand Balun, and this enables the series line length to shorten compared to the series connection. And it is possible to reduce the loss at the power combiner caused by the series resistance of the transmission line and the substrate resistance. The frequency characteristics are also improved because the series line length is shortened. And the output power, available bandwidth and efficiency of the power amplifier using this power combiner are improved because the loss is reduced and the frequency bandwidth is widened.

Second Embodiment

Figure 3:
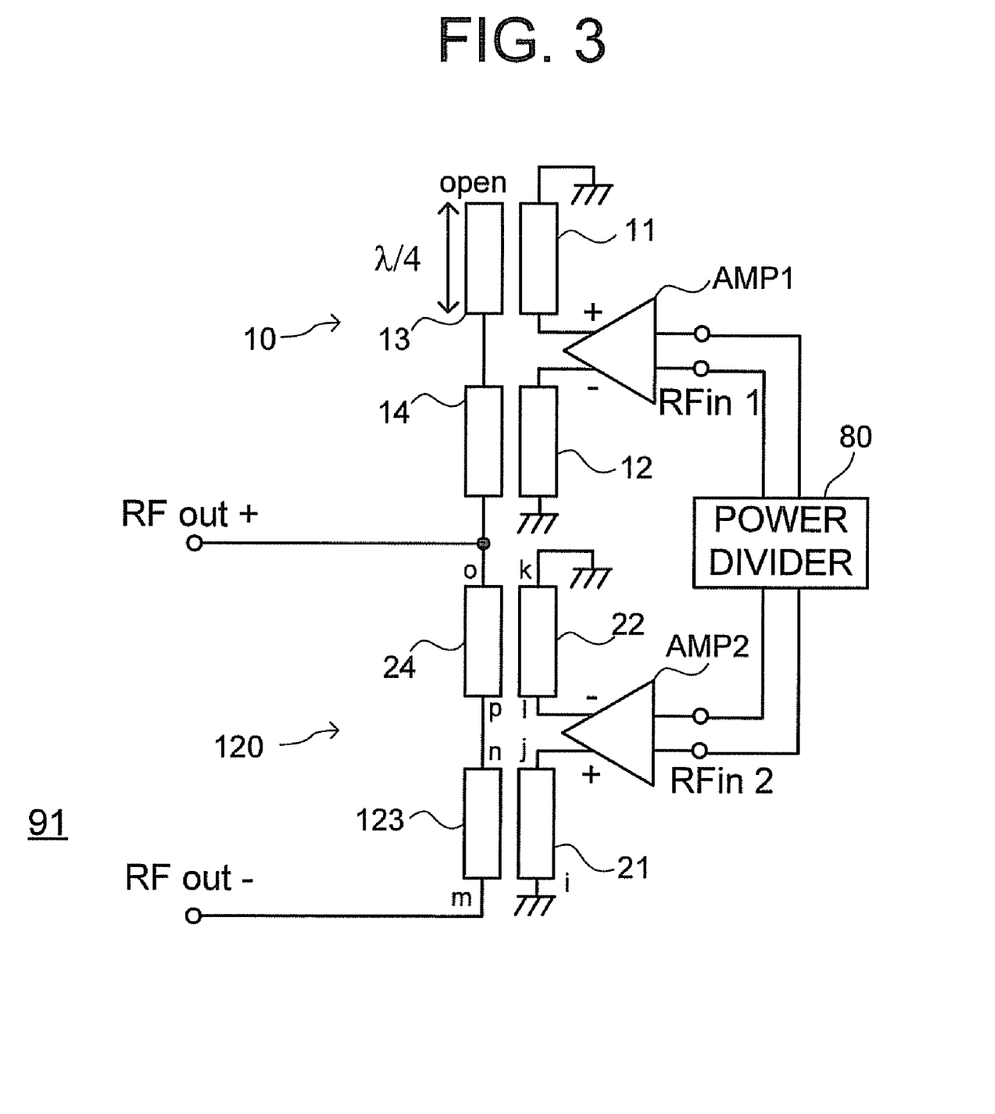
FIG. 3 is a block diagram showing a part of configuration of the transmitter of the other embodiment of the present invention.

Next, a transmitter of the other embodiment of the present invention will be described with reference to FIG. 3. FIG. 3 is a block diagram showing a configuration of the power combiner 91 and the amplifier among that of the transmitter of the other embodiment of the present invention. The transmitter of this embodiment includes an RF positive output (RFout+) instead of the RF output (RFout) among the elements of the transmitter shown in FIG. 1, and further includes an RF negative output (RFout−) at the end (m) of the seventh line. So the common elements are shown with the same symbols, and the redundant description and the redundant showings in the drawings are omitted.

The power combiner 91 of this embodiment includes a second balun 120 being modified based on the second balun 20 shown in FIG. 1. Specifically, the second balun 120 includes: the fifth line 21 with λ/4 length in which one end (i) thereof is grounded and another and (j) thereof is connected to the positive output of the amplifier AMP2; the sixth line 22 with λ/4 length in which one end (k) thereof is grounded and another end (l) thereof is connected to the negative output of the amplifier AMP2; the seventh line 123 with λ/4 length formed in parallel with the fifth line 21 in which one end (m) thereof corresponding to the grounded end (i) of the fifth line 21 is connected to the RF negative output (RFout−); and the eighth line 24 with λ/4 length formed in parallel with the sixth line 22 in which the end (o) thereof corresponding to the grounded end (k) of the sixth line 22 is connected to the RF positive output (RFout+) and another end (p) thereof is connected to another end (n) of the seventh line 123.

As shown in FIG. 2C and FIG. 2D, a phase difference between at the end (o) of the eighth line 24 and at the end (m) of the seventh line 23 (123) is given 180 degrees. According to this embodiment, it is configured that the RF positive output (RFout+) and the RF negative output (RFout−) give a differential output by use of the above characteristic.

According to the power combiner, the amplifier and the transmitter of this embodiment, it is possible to reduce the loss at the power combiner caused by the series resistance and the substrate resistance, and further widen the available frequency bandwidth. As a result, it is possible to improve output power, efficiency, and bandwidth for the amplifier and the transmitter in total.

Third Embodiment

Figure 4:
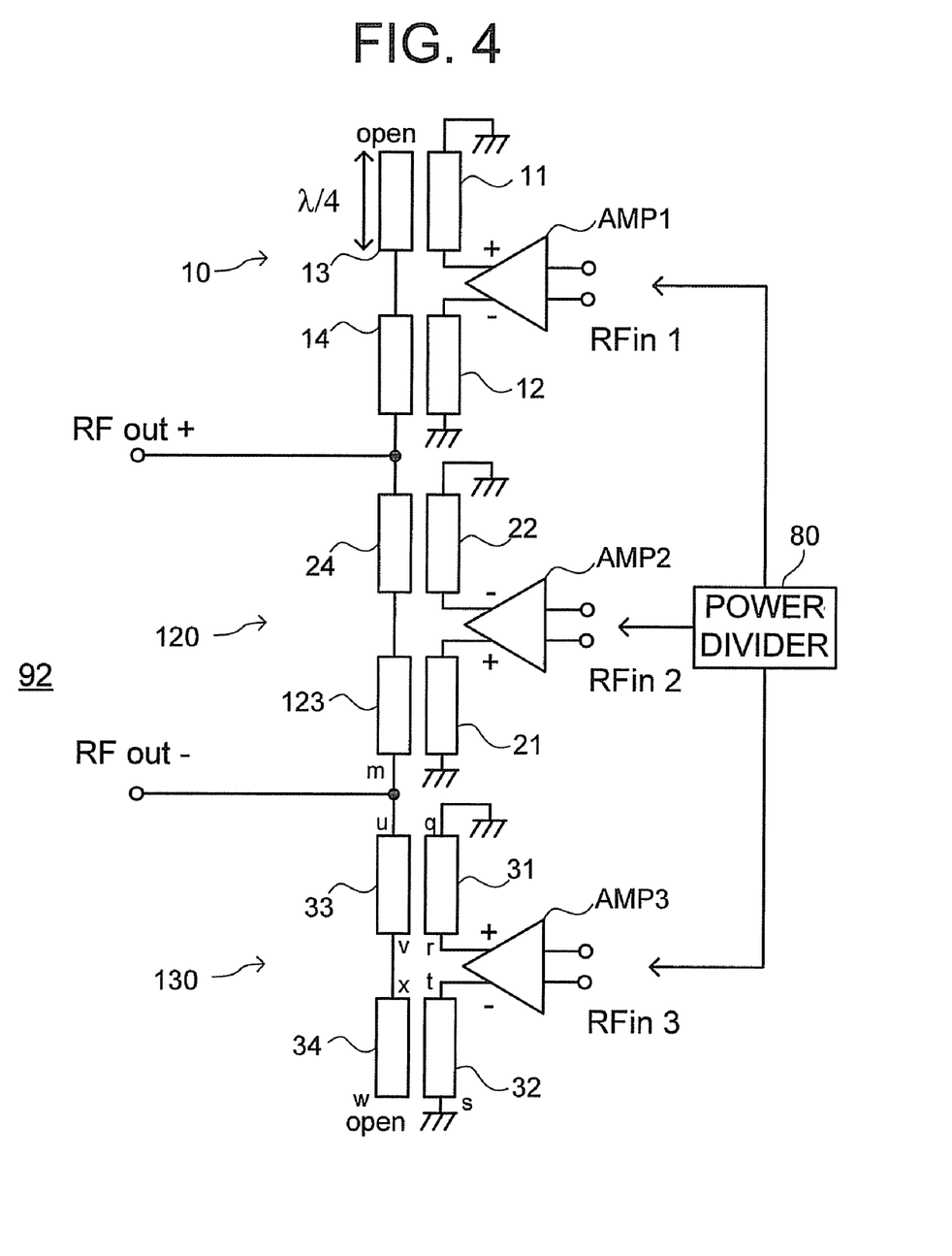
FIG. 4 is a block diagram showing a part of configuration of the transmitter of the other embodiment of the present invention.

Next, a transmitter of the other embodiment of the present invention will be further described with reference to FIG. 4. FIG. 4 is a block diagram showing a configuration of the power combiner 92 and the amplifier among the elements of the transmitter of the still other embodiment of the present invention. The transmitter of this embodiment further includes a third balun 130 and an amplifier AMP3 in addition to the configuration of the transmitter shown in FIG. 3. So the common elements are shown with the same symbols, and the redundant description and the redundant showings in the drawings are omitted.

The power combiner 92 of this embodiment further includes a third balun 130. The third balun 130 includes: a ninth line 31 with λ/4 length in which one end (q) thereof is grounded and another end (r) thereof is connected to the positive output of the amplifier AMP3; a tenth line 32 with λ/4 length in which one end (s) thereof is grounded and another end (t) thereof is connected to the negative output of the amplifier AMP3; an eleventh line 33 with λ/4 length formed in parallel with the ninth line 31 in which one end (u) thereof corresponding side to the grounded end (q) of the ninth line 31 is connected to the negative output (RFout−); and a twelfth line 34 with λ/4 length formed in parallel with the tenth line 32 in which one end (w) thereof corresponding side to the grounded end (s) of the tenth line 32 is opened and another end (x) thereof is connected to another end (v) of the eleventh line 33.

As shown in FIG. 2A to FIG. 2D, a phase difference between the end (u) of the eleventh line 33 and the end (w) of the twelfth line 34 is given 180 degrees. This embodiment is also configured to obtain the differential output as similar as the embodiment shown in FIG. 3.

According to the power combiner, the amplifier and the transmitter of this embodiment, it is possible to reduce the loss at the power combiner caused by the series resistance and the substrate resistance, and further widen the available frequency bandwidth. As a result, it is possible to improve output power, efficiency, and bandwidth for the amplifier and the transmitter in total.

Forth Embodiment

Figure 5A:
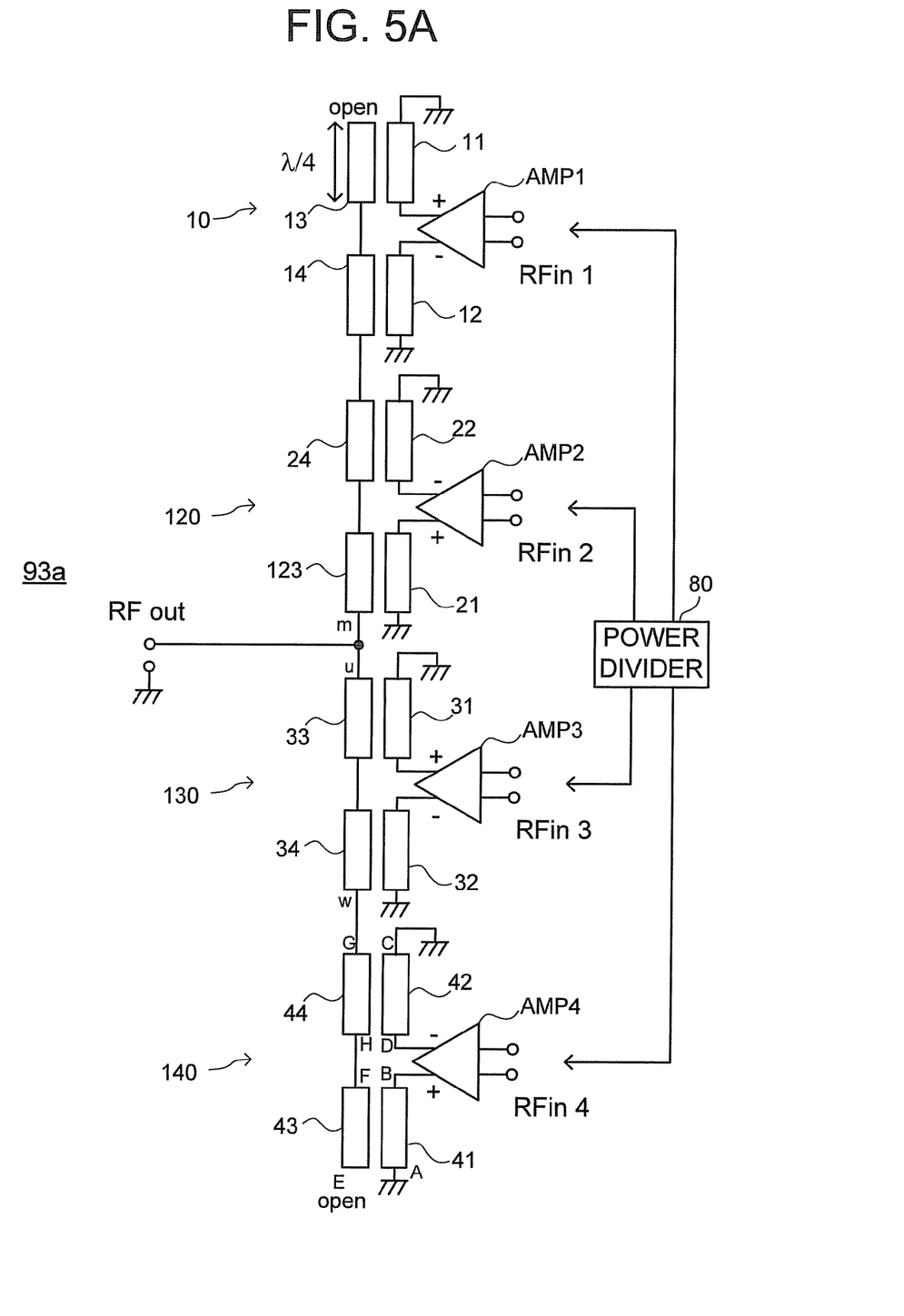
FIG. 5A is a block diagram showing a part of configuration of the transmitter of the other embodiment of the present invention.
Figure 5B:
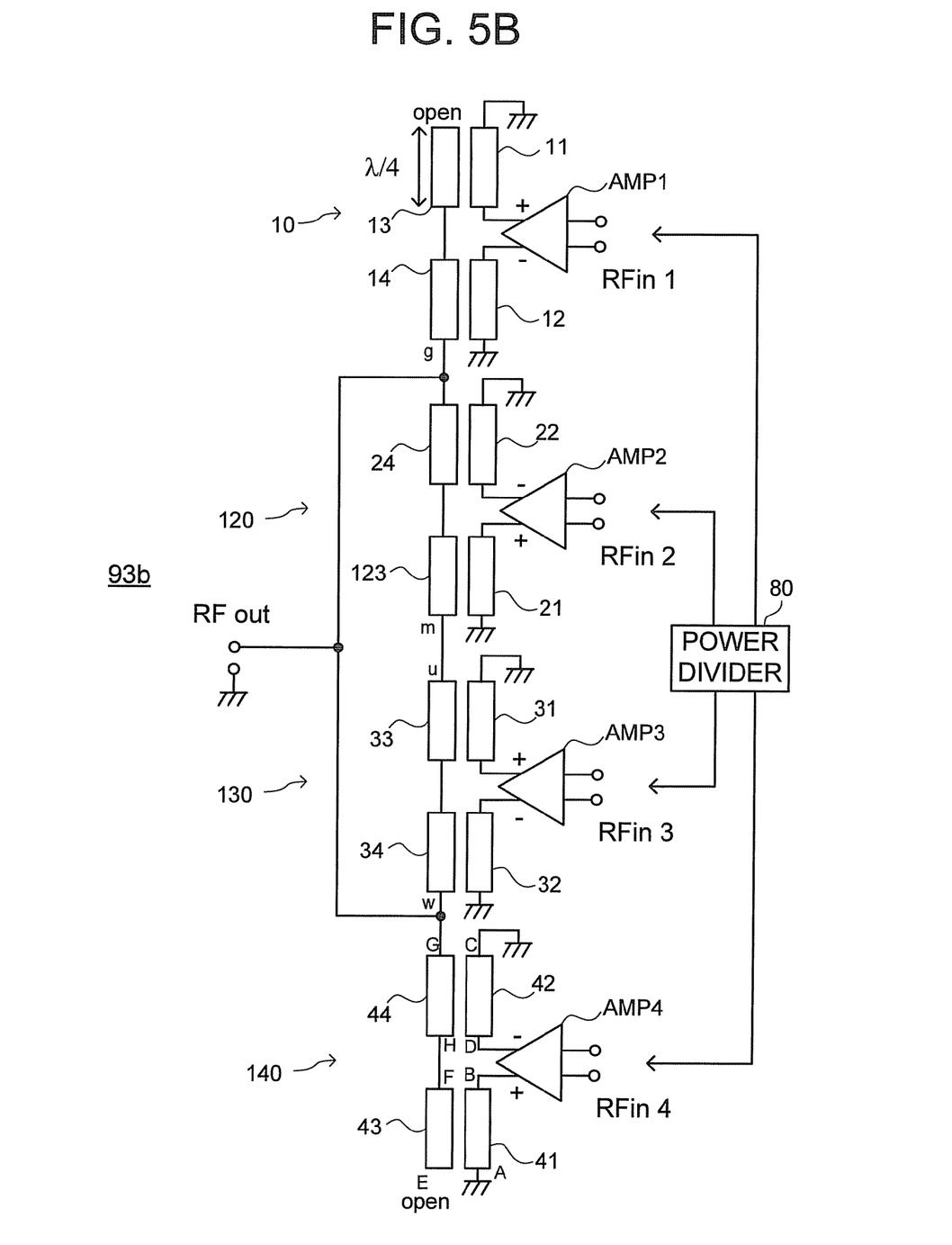
FIG. 5B is a block diagram showing a modified example of the embodiment shown in FIG. 5A.

Next, a transmitter of the still other embodiment of the present invention will be described with reference to FIG. 5A and FIG. 5B. FIG. 5A is a block diagram showing a configuration of the power combiner 93a and the amplifier among the elements of the transmitter of the still other embodiment of the present invention, FIG. 5B is a block diagram showing a modified example of the transmitter shown in FIG. 5A. The transmitter of this embodiment further includes a forth balun 140 and an amplifier AMP4 in addition to the configuration of the transmission shown in FIG. 4, and includes the RF output (RFout) having the modified connection point. So the common elements are shown with the same symbols, and the redundant description and the redundant showings in the drawings are omitted.

The power combiner 93a of this embodiment further includes a fourth balun 140. The fourth balun 140 includes: a thirteenth line 41 with λ/4 length in which one end (A) thereof is grounded and another end (B) thereof is connected to the positive output of the amplifier AMP4; a fourteenth line 42 with λ/4 length in which one end (C) thereof is grounded and another end (D) thereof is connected to the negative output of the amplifier AMP4; a fifteenth line 43 with λ/4 length formed in parallel with the thirteenth line 41 in which one end (E) thereof corresponding side to the grounded end (A) of the thirteenth line 41 is opened; and a sixteenth line 44 with λ/4 length formed in parallel with the fourteenth line 42 in which one end (G) thereof corresponding side to the grounded end (C) of the fourteenth line 42 is connected to the end (w) of the twelfth line 34 and another end (H) thereof is connected to another end (F) of the fifteenth line 43. Further, the RF positive output (RFout+) is removed and the RF negative output (RFout−) is used as the single-ended output, RF output (RFout). As a result, it is configured that the additional Marchand Balun is added to each of the opened ends of the first balun 10 and the second balun 20 of the power combiner 90 of the transmitter shown in FIG. 1.

As shown in FIG. 2A to FIG. 2D, a phase difference between the end (E) of the fifteenth line 43 and the end (G) of the sixteenth line 44 is given 180 degrees. In this embodiment, as similar as the power combiner 90 shown in FIG. 1, the RF output (RFout) is provided at the end (m) of the seventh line 123 of the second balun 120, i.e. at the center of the line.

According to the power combiner, the amplifier and the transmitter of this embodiment, it is possible to reduce the loss at the power combiner caused by the series resistance and the substrate resistance, and further widen the available frequency bandwidth. As a result, it is possible to realize high output power, high efficiency, and wide bandwidth for the amplifier and the transmitter in total. Especially in this embodiment, since the RF output signal is obtained from the center of the line, the power combiner having balanced and wide bandwidth characteristics can be obtained.

The power combiner 93b shown in FIG. 5B is configured to change the connection point of the RF output of the power combiner 93a shown in FIG. 5A. Specifically, the RF output (RFout) is connected to the end (g) of the fourth line 14 of the first balun 10 and the end (w) of the twelfth line 34 of the third balun 130. According to the power combiner 93b of this embodiment, as compared to the power combiner 93a shown in FIG. 5A, the combined output is obtained at the plural ends in parallel. Therefore it is possible to reduce the loss caused by the series resistance and the substrate resistance further.

Fifth Embodiment

Figure 6:
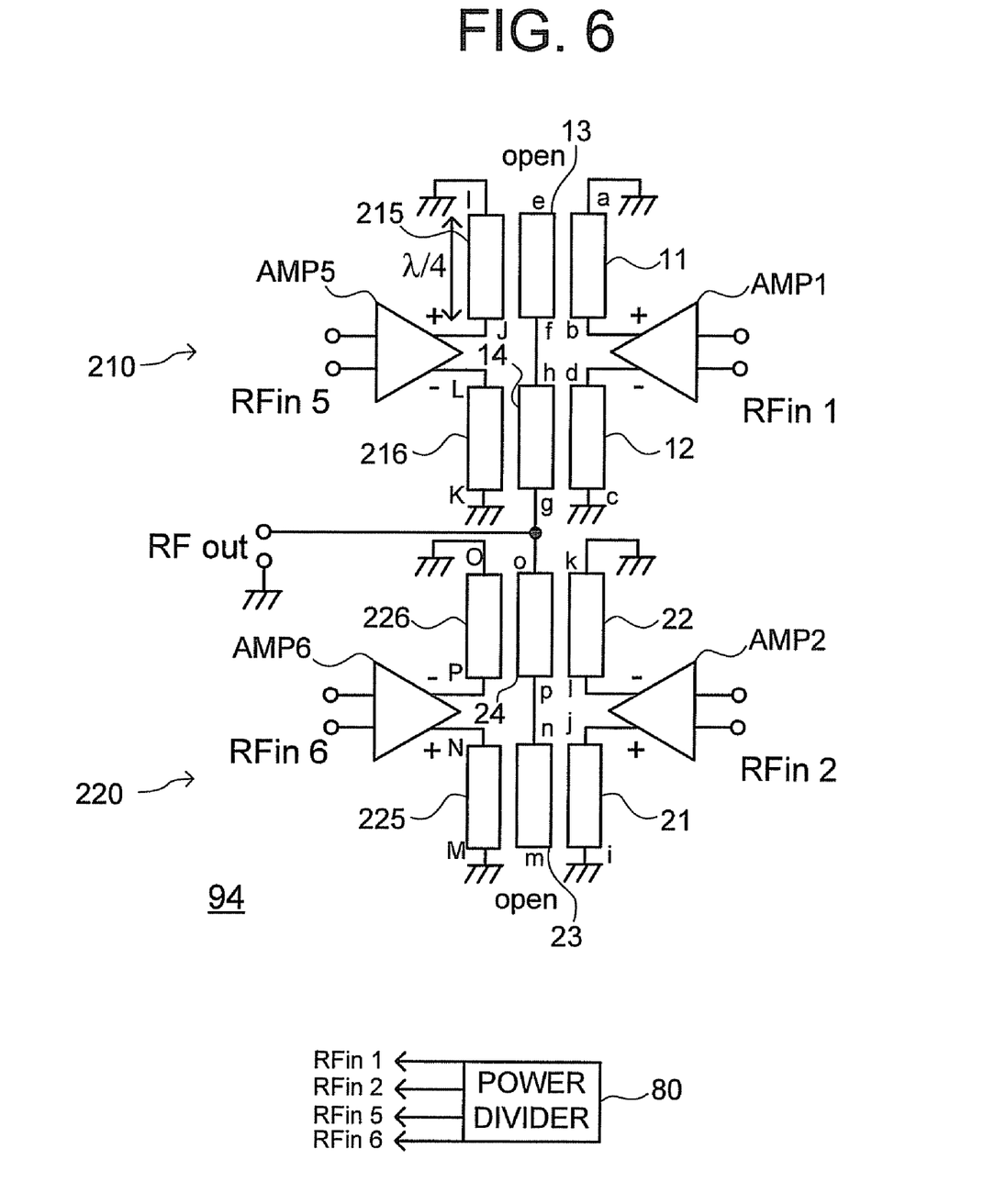
FIG. 6 is a block diagram showing a part of configuration of the transmitter of the other embodiment of the present invention.

Next, a transmitter of the still other embodiment of the present invention will be described with reference to FIG. 6. FIG. 6 is a block diagram showing a configuration of the power combiner 94 and amplifier among the elements of the transmitter of the still other embodiment of the present invention. The transmitter of this embodiment is configured to change the configuration of the first balun 10 and the second balun 20 shown in FIG. 1. So the common elements are shown with the same symbols, and the redundant description and the redundant showings in the drawings are omitted.

As shown in FIG. 6, the first balun 210 of this embodiment includes: a seventeenth line 215 with λ/4 length formed in parallel with the third line 13 in which one end (I) thereof is grounded and another end (J) thereof is connected to the positive output of the amplifier AMP5; and a eighteenth line 216 with λ/4 length formed in parallel with the fourth line 14 in which one end (K) thereof is grounded and another end (L) thereof is connected to the negative output of the amplifier AMP5 in addition to the configuration of the first balun 10. Similarly, the second balun 220 of this embodiment includes: a nineteenth line 225 with λ/4 length formed in parallel with the seventh line 23 in which one end (M) thereof is grounded and another end (N) thereof is connected to the positive output of the amplifier AMP6; and a twentieth line 226 with λ/4 length formed in parallel with the eighth line 24 in which one end (O) thereof is grounded and another end (P) thereof is connected to the negative output of the amplifier AMP6 in addition to the configuration of the second balun 20.

The seventeenth line 215 is electromagnetically coupled to the third line 13 as similar as the first line 11. Similarly, the eighteenth line 216 is coupled to the fourth line 14 as similar as the second line 12, the nineteenth line 225 is coupled to the seventh line 23 as similar as the fifth line 21, and the twentieth line 226 is coupled to the eighth line 24 as similar as sixth line 22, electromagnetically respectively.

In the power combiner 94 of this embodiment, the coupling to the line being connected to the RF output is in common. Therefore, the number of baluns being capable of connecting in parallel can be increased, and this enables to reduce the required area and volume. Moreover, it is expected that the loss caused by the series resistance and the substrate resistance can be further reduced.

Application Example

Figure 7:
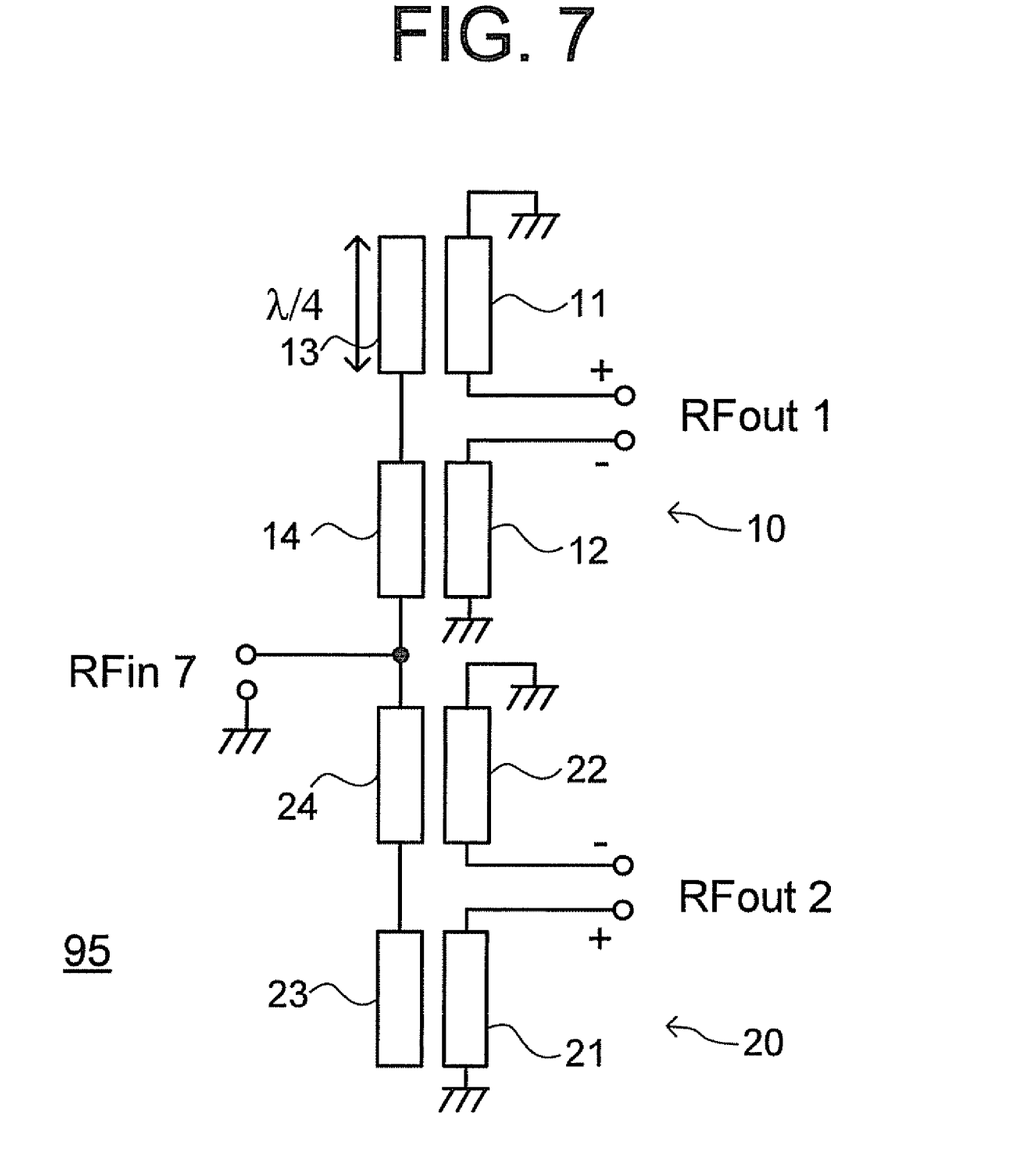
FIG. 7 is a diagram showing a configuration of a power divider applied with the power combiner of the embodiments of the present invention.

Next, the application example of the power combiner of the embodiments of the present invention will be described with reference to FIG. 7. FIG. 7 is a diagram describing the application example of the power combiner of the embodiments of the present invention.

In general, it is known that the passive balun can be used with the similar characteristics even though the input and the output thereof are replaced each other. In the application example shown in FIG. 7, the power divider 95 having an RF output 1 (RFout1) and an RF output 2 (RFout2) which are the amplified inputs of the power combiner 90 of the embodiments of the present invention, and having an RF input (RFin 7) which is the RF output of the power combiner 90 is realized. According to the configuration, the power divider providing similar benefits as the power combiner 90 can be obtained. Certainly, the power divider can be obtained if the input and the output of the other power combiners 91 to 94 of the embodiments of the present invention are replaced each other. According to the above embodiments, it is possible to suppress the degradation of the output power, the efficiency and the available frequency bandwidth.

The present invention is not limited to the above embodiments as it is, and any of the elements may be modified to realize without departing from the gist of the present invention. For example, according to the description of the above embodiment, it is explained that the transmission lines in which the lines are formed on the prescribed dielectric substrate are placed closely in a plain surface, but it is not limited thereto. For example of the power combiner 90 shown in FIG. 1, the first line 11 and the second line 12 may be formed on a first substrate, and the third line 13 and the fourth line 14 may be formed on a second substrate to form a layer structure having the first and the second substrates, in order to realize the electromagnetic couplings between the lines. Such structure enables to reduce the required area on the substrate. Especially in the power combiner 94 of the embodiment shown in FIG. 6, it is expected to obtain the merit of reducing the noise mixed from outside because of the steric structure.

Further, several types of the invention may be made by appropriate combination of the plural elements disclosed in the above embodiments. For example, some element may be removed from all of the elements of the configurations shown in the embodiments, and the elements belonging to the different embodiments respectively may be combined appropriately.

The present invention may be applied to the telecommunication manufacturing industry.

What is claimed is:

1. A power combiner for combining a plurality of differential signals to an unbalanced signal, comprising a first balun and a second balun,
the first balun including:
a first line having
a first grounded end and
a first end connected to a positive input of a first differential input signal;
a second line having
a second grounded end and
a second end connected to a negative input of the first differential input signal;
a third line formed in parallel with the first line, the third line having
a first opened end corresponding to the first grounded end of the first line and
a third end corresponding to the first end of the first line; and
a fourth line formed in parallel with the second line, the fourth line having
a fourth end corresponding to the second grounded end of the second line and
a fifth end corresponding to the second end of the second line and connected to the third end of the third line, the fourth end being connected to a single-ended output end for outputting the unbalanced signal with respect to the ground, and the second balun including:
a fifth line having
a third grounded end and
a sixth end connected to a positive input of a second differential input signal;
a sixth line having
a fourth grounded end and
a seventh end connected to a negative input of the second differential input signal;
a seventh line formed in parallel with the fifth line, the seventh line having
a second opened end corresponding to the third grounded end of the fifth line and
an eighth end corresponding to the sixth end of the fifth line; and
an eighth line formed in parallel with the sixth line, the eighth line having
a ninth end corresponding to the fourth grounded end of the sixth line and connected to the fourth end of the fourth line and
a tenth end corresponding to the seventh end of the sixth line and connected to the eighth end of the seventh line.

2. The power combiner of claim 1, wherein the first to eighth lines have a line length of a quarter of wavelength $\lambda$ of combined signal.

3. The power combiner of claim 1, wherein
the first line is electromagnetically coupled to the third line,
the second line is electromagnetically coupled to the fourth line,
the fifth line is electromagnetically coupled to the seventh line, and
the sixth line is electromagnetically coupled to the eighth line, respectively.

4. An amplifier, comprising:
the power combiner according to claim 1;
a first amplifier unit to give the first differential input signal to the first balun; and
a second amplifier unit to give the second differential input signal to the second balun.

5. A transmitter, comprising:
a local oscillator to generate a local signal for converting a baseband signal to an RF signal;
a mixer to multiply the baseband signal and the local signal to generate the RF signal;
the amplifier of claim 4; and a power divider to divide the RF signal generated by the mixer to the first amplifier unit and the second amplifier unit of the amplifier.

6. The power combiner of any one of claims 1 to 3, wherein the first balun further includes:
   a ninth line formed in parallel with the third line, the ninth line having
      a fifth grounded end corresponding to the first opened end of the third line and
      an eleventh end corresponding to the third end of the third line and connected to a positive input of a third differential input signal; and
   a tenth line formed in parallel with the fourth line, the tenth line having
      a sixth grounded end corresponding to the fourth end of the fourth line and
      a twelfth end corresponding to the fifth end of the fourth line and connected to a negative input of the third differential input signal, and
the second balun further includes:
   an eleventh line formed in parallel with the seventh line, the eleventh line having
      a seventh grounded end corresponding to the second opened end of the seventh line and
      a thirteenth end corresponding to the eighth end of the seventh line and connected to a positive input of a fourth differential input signal; and
   a twelfth line formed in parallel with the eighth line, the twelfth line having
      an eighth grounded end corresponding to the ninth end of the eighth line and
      a fourteenth end corresponding to the tenth end of the eighth line and connected to a negative input of the fourth differential input signal.

7. A power combiner for combining a plurality of differential signals to a single differential signal, comprising a first balun, a second balun and a third balun, wherein
the first balun including:
   a first line having
      a first grounded end and
      a first end connected to a positive input of a first differential input signal;
   a second line having
      a second grounded end and
      a second end connected to a negative input of the first differential input signal;
   a third line formed in parallel with the first line, the third line having
      a first opened end corresponding to the first grounded end of the first line and
      a third end corresponding to the first end of the first line;
   a fourth line formed in parallel with the second line, the fourth line having
      a fourth end corresponding to the second grounded end of the second line and
      a fifth end corresponding to the second end of the second line and connected to the third end of the third line, the fourth end being connected to a positive output node for the differential signal, and
the second balun including:
   a fifth line having
      a third grounded end and
      a sixth end connected to a positive input of a second differential input signal;
   a sixth line having
      a fourth grounded end and
      a seventh end connected to a negative input of the second differential input signal;
   a seventh line formed in parallel with the fifth line, the seventh line having
      an eighth end corresponding to the third grounded end of the fifth line and
      a ninth end corresponding to the sixth end of the fifth line, the eighth end being connected to a negative output node for the differential signal; and
   an eighth line formed in parallel with the sixth line, the eighth line having
      a tenth end corresponding to the fourth grounded end of the sixth line and connected to the fourth end of the fourth line and
      an eleventh end corresponding to the seventh end of the sixth line and connected to the ninth end of the seventh line, and
the third balun including:
   a ninth line having
      a fifth grounded end and
      a twelfth end connected to a positive input of a third differential input signal;
   a tenth line having
      a sixth grounded end and
      a thirteenth end connected to a negative input of the third differential input signal;
   an eleventh line formed in parallel with the ninth line, the eleventh line having
      an fourteenth end corresponding to the fifth grounded end of the ninth line and connected to the eighth end of the seventh line and
      a fifteenth end corresponding to the twelfth end of the ninth line; and
   a twelfth line formed in parallel with the tenth line, the twelfth line having
      a second opened end corresponding to the sixth grounded end of the tenth line and
      a sixteenth end corresponding to the thirteenth end of the tenth line and connected to the fifteenth end of the eleventh line.

* * * * *